US012680652B2

(12) United States Patent
Hulse et al.

(10) Patent No.: US 12,680,652 B2
(45) Date of Patent: Jul. 14, 2026

(54) METHOD AND SYSTEM FOR COMPACT AND HYPER MOBILE RECOMPRESSION

(71) Applicant: Clean Recompression, LLC, Houston, TX (US)

(72) Inventors: James Hulse, Houston (JP); Zachary Shaaban, Houston, TX (US)

(73) Assignee: Clean Recompression, LLC, Houston, TX (US)

( * ) Notice: Subject to any disclaimer, the term of this patent is extended or adjusted under 35 U.S.C. 154(b) by 300 days.

(21) Appl. No.: 18/188,988

(22) Filed: Mar. 23, 2023

(65) Prior Publication Data

US 2024/0318786 A1 Sep. 26, 2024

(51) Int. Cl.
*F17C 5/06* (2006.01)
*F17C 13/08* (2006.01)

(52) U.S. Cl.
CPC ................ *F17C 5/06* (2013.01); *F17C 13/08* (2013.01); *F17C 2223/0123* (2013.01); *F17C 2227/0185* (2013.01); *F17C 2227/0346* (2013.01); *F17C 2265/015* (2013.01)

(58) Field of Classification Search
CPC .... F17C 5/06; F17C 13/08; F17C 2223/0123; F17C 2227/0185; F17C 2227/0346; F17C 2265/015
See application file for complete search history.

(56) References Cited

U.S. PATENT DOCUMENTS

| | | | | | |
|---|---|---|---|---|---|
| 2,498,229 | A * | 2/1950 | Adler | B60P 3/14 | 222/626 |
| 4,022,550 | A * | 5/1977 | Brink | F04B 39/0033 | 417/313 |
| 5,518,262 | A * | 5/1996 | Hutchinson | B60D 1/167 | 280/475 |
| 6,629,825 | B2 * | 10/2003 | Stickland | F04B 35/04 | 417/423.15 |
| 7,721,557 | B1 * | 5/2010 | Stearns | F17C 7/02 | 62/48.2 |
| 10,760,007 | B2 * | 9/2020 | Goessl | F17C 13/00 | |
| 11,203,968 | B2 * | 12/2021 | Jochman | F01P 1/06 | |
| 11,549,496 | B2 * | 1/2023 | Elmer, Jr. | F04B 25/00 | |
| 12,123,407 | B2 * | 10/2024 | Alulkar | F28D 9/0093 | |
| 2003/0019509 | A1 * | 1/2003 | Locascio | B08B 17/00 | 134/10 |
| 2003/0215339 | A1 * | 11/2003 | Grimmer | F04D 27/02 | 417/201 |
| 2007/0062605 | A1 * | 3/2007 | Wilson | F02M 21/00 | 141/231 |
| 2016/0187893 | A1 * | 6/2016 | Bergh | G05D 16/2046 | 137/565.11 |
| 2019/0031156 | A1 * | 1/2019 | Fukuda | B60S 5/02 | |

* cited by examiner

*Primary Examiner* — Nicolas A Arnett
(74) *Attorney, Agent, or Firm* — Baker Botts L.L.P.

(57) ABSTRACT

Methods and systems for recompression are disclosed. In certain embodiments, a method may include receiving a fluid from a first conduit or container at a first pressure. The method may include using a multi-stage compressor which is non-removably mounted to a trailer to compress the fluid through one or more compression stages. The method may include cooling the fluid after each stage of compression, scrubbing liquid from the fluid before each stage of compression, and discharging the fluid to a second conduit or container at a second pressure.

20 Claims, 6 Drawing Sheets

METHOD AND SYSTEM FOR COMPACT AND HYPER MOBILE RECOMPRESSION

TECHNICAL FIELD

The present disclosure relates to methods and systems for recompression. More specifically, the present disclosure relates to recompression systems non-removably mounted on a trailer.

BACKGROUND

Recompression is an important technique to support pipeline and vessel operations for safety, reliability and environmental concerns. For example, recompression can be used to recapture a process gas removed from an isolated volume and reintroduce the recaptured process gas into an adjacent volume. For example, recompression can apply a mobile recompression unit to transfer a gas from one pipeline to an adjacent pipeline or across a block valve or stopple to pass it safely down the line when a miles-long section of pipeline is out of service for planned maintenance, integrity inspection, upgrade, replacement, or repair. Recompression may be used to reduce methane emissions and flaring, and maintain pipeline integrity during large transmission pipeline blowdowns, resulting in more natural gas available for sale. However, traditional recompression equipment is heavy and bulky, and must be transported by large trucks (e.g., Class 7 or 8 semi trucks) that require specialized drivers and may not fit into some service areas. Likewise, existing recompression operations are often costly and logistically complicated due to the need to hire both drivers to haul the large trucks pulling the recompression equipment and operators who commute separately and meet the truck at a customer site. Thus, there is a need for more compact and efficient recompression systems.

SUMMARY

In accordance with the above, presently disclosed embodiments are directed to a method and system for using a recompression system.

Among the many potential advantages to the methods, apparatus, and systems of the present disclosure, only some of which are alluded to herein, the present disclosure may provide recompression systems and methods that are more compact, cheaper, and simpler than existing recompression systems and methods. For example, in certain embodiments, the methods and system of the present disclosure may provide controlled methane recompression during pipeline outages, while also allowing higher flow rates and less down time. In some embodiments, the method and systems of the present disclosure may provide recompression systems with a total weight below the towing capacity of a medium-duty truck (e.g., Class 3 truck, 1 ton pickup truck). In some embodiments, method and systems of the present disclosure may provide a recompression system with a reduced footprint that can fit into more customer locations (e.g., smaller work sites) than traditional recompression systems. In certain embodiments, the methods and systems of the present disclosure may be easier to transport and operate than existing recompression systems due to being non-removably mounted on a gooseneck trailer that can be hauled by the system operator. In certain embodiments, the methods and systems of the present disclosure may be easier to transport and operate than existing recompression systems due to being non-removably mounted on a gooseneck trailer that can be hauled by the system operator. The gooseneck trailer can include a gooseneck hitch or a fifth wheel connection for a smooth and stable ride.

In an embodiment, a method may comprise receiving a fluid from a first conduit or container at a first pressure, compressing, using a multi-stage compressor non-removably mounted to a trailer, the fluid through one or more compression cycles, cooling the fluid after compression, scrubbing liquid from the fluid, and discharging the fluid to a second conduit or container at a second pressure. In an embodiment, the multi-stage compressor is coupled to a control system and an electric motor that are also non-removably mounted to the trailer. In an embodiment, the multi-stage compressor is coupled to a control system and a direct drive internal combustion engine that are also non-removably mounted to the trailer. In an embodiment, the internal combustion engine could be mounted to the trailer via a mounting bracket and/or a small mounting skid. In an embodiment, the trailer is a gooseneck trailer. In an embodiment, the multi-stage compressor and trailer do not include a skid. In an embodiment, a plurality of electrical components and the control system are mounted at an end of the trailer closest to a trailer jack. In other embodiments, the plurality of electrical components and/or control system may be mounted at other locations on the trailer, for example, adjacent to other parts of the recompression system. As an example and not by way of limitation, the plurality of electrical components and the control system can be Class 1 Division 1 or Division 2 electric systems or explosion proof electrical components. In an embodiment, electric systems and wiring in locations can be classified depending on the properties of flammable vapors, liquids, gases, combustible dusts or fibers which may cause a presence of a flammable or combustible concentration or quantity. A Class 1 Division 1 or Division 2 electric system can include threaded rigid metal or threaded steel intermediate conduits. In an embodiment, an explosion-proof electric system can contain any explosion originating within the system and prevent sparks from within the system from igniting vapors, gases, dust, or fibers in the air surrounding the explosion proof system. In an embodiment, the multi-stage compressor is transported to a work site by hauling the gooseneck trailer using a Class 3 truck. In an embodiment, the multi-stage compressor is transported to a work site by hauling the gooseneck trailer using a Class 3 truck. In an embodiment, the electric motor can rotate at 1,800 RPM, and the first and second pressures are each in the range of from 0 pounds per square inch gauge (psig) to about 1,100 psig for suction and discharging. In some embodiments, the electric motor can rotate at from about 1,782 to about 1,800 RPM. In some embodiments, the electric motor can turn at from about 1,485 to about 1,500 RPM. In certain embodiments, the electric motor may be a variable frequency drive (VFD) and the rotation speed may depend on the voltage frequency. In certain embodiments, the electric motor may be designed to operate at a lower RPM, e.g., lower than 1,800 RPM, 1,700 RPM, or 1,500 RPM.

As used herein, “fluid” may refer to a liquid, gas, or some combination thereof. In some embodiments, the fluid may be a process gas such as natural gas.

In an embodiment, the method may comprise cooling the fluid with a cooler mounted to the trailer and scrubbing the liquid from the fluid using a plurality of scrubbers. In certain embodiments, one or more compression stages may increase the temperature of the fluid, and one or more cooling steps may be used to remove heat from (i.e., cool) the fluid between one or more compression stages. In an embodiment, the method may maintain the second pressure of the fluid to about the same as the first pressure of the fluid.

In an embodiment, a system may comprise a recompression system comprising a multi-stage compressor, one or more scrubbers, and a prime mover (e.g., natural gas engine) mounted on a trailer. In an embodiment, the multi-stage recompression system is configured to receive a fluid from a first conduit or container at a first pressure, scrub liquid from the fluid, compress the fluid through one or more compression stages, cool the fluid after being compressed between stages, and discharge the fluid to a second conduit or container at a second pressure. In an embodiment, the multi-stage compressor is coupled to a control system and an electric motor that are also non-removably mounted to the trailer. In an embodiment, the multi-stage compressor is coupled to a control system and a direct drive internal combustion engine that are also non-removably mounted to the trailer. In an embodiment, the internal combustion engine could be mounted to the trailer via a mounting bracket and/or a small mounting skid. In an embodiment, the trailer is a gooseneck trailer. In an embodiment, the multi-stage compressor and trailer do not include a skid. In an embodiment, a plurality of electrical components and the control system are mounted at an end of the trailer closest to a trailer jack. In other embodiments, the plurality of electrical components and/or control system may be mounted at other locations on the trailer, for example, adjacent to other parts of the recompression system. As an example and not by way of limitation, the plurality of electrical components and the control system can be Class 1 Division 1 or Division 2 electric systems or explosion proof electrical components. In an embodiment, the multi-stage compressor is transported to a work site by hauling the gooseneck trailer using a Class 3 truck. In an embodiment, the multi-stage compressor is transported to a work site by hauling the gooseneck trailer using a Class 3 truck. In an embodiment, the electric motor can rotate at 1,800 RPM, and the first and second pressures are each in the range of from about 0 psig to about 1,100 psig. In some embodiments, the electric motor can rotate at from about 1,782 to about 1,800 RPM. In some embodiments, the electric motor can rotate at from about 1,485 to about 1,500 RPM. In certain embodiments, the electric motor may be a variable frequency drive (VFD) and the rotation speed may depend on the voltage frequency. In certain embodiments, the electric motor may be designed to operate at a lower RPM, e.g., lower than 1,800 RPM, 1,700 RPM, or 1,500 RPM.

In an embodiment, the system may cool the fluid with a cooler mounted to the trailer and scrub the liquid from the fluid using a plurality of scrubbers. In certain embodiments, one or more compression stages may increase the temperature of the fluid, and one or more cooling steps may be used to remove heat from (i.e., cool) the fluid between one or more compression stages. In an embodiment, the system may maintain the second pressure of the fluid to about the same as the first pressure of the fluid.

In an embodiment, a recompression system may comprise an inlet couplable to a first conduit or container configured to receive a fluid at a first pressure. The recompression system may comprise an outlet couplable to a second conduit or container configured to discharge the fluid at a second pressure. The recompression system may comprise a plurality of scrubbers. The recompression system may comprise a multi-stage compressor non-removably mounted to a trailer which is configured to receive the fluid from the first conduit or container at the first pressure, scrub liquid from the fluid using the plurality of scrubbers, compress the fluid through one or more compression cycles, cool the fluid after compression between stages, and discharge the fluid to the second conduit or container at the second pressure.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1A:
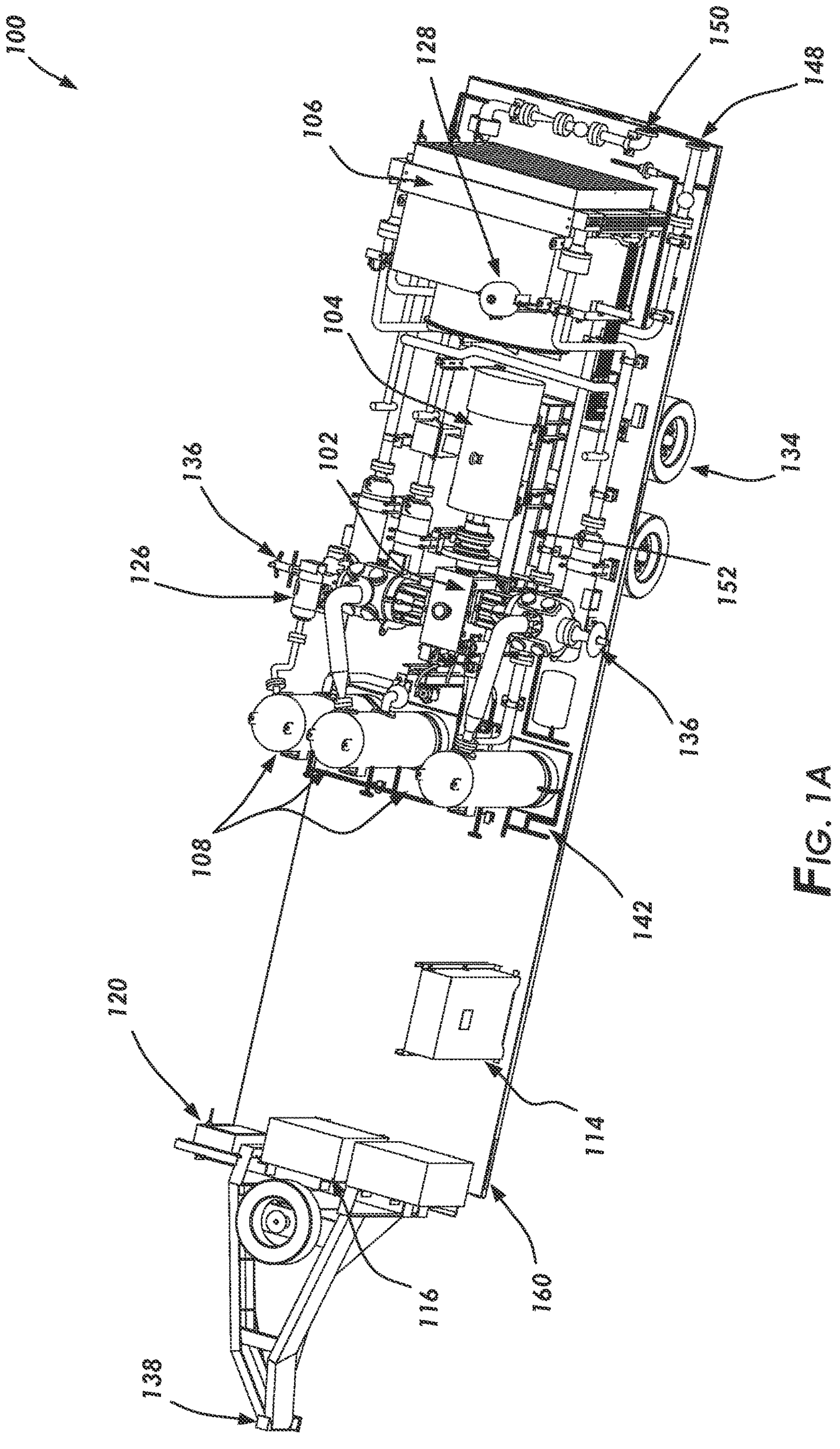
FIGS. 1A and 1B depict a trailer-mounted recompression system, in accordance with aspects of the present disclosure.

Illustrative embodiments of the present disclosure are described in detail herein. In the interest of clarity, not all features of an actual implementation are described in this specification. It will of course be appreciated that in the development of any such actual embodiment, numerous implementation-specific decisions must be made to achieve the developers' specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of the present disclosure. Furthermore, in no way should the following examples be read to limit, or define, the scope of the disclosure.

In certain embodiments, the methods and systems of the present disclosure may include a trailer-mounted recompression system. In certain embodiments, the methods and systems of the present disclosure may reduce controlled methane emission during pipeline outages. In one or more embodiments, the recompression system may comprise a compressor (e.g., a multi-stage compressor), a control system, a prime mover (e.g., a natural gas engine), an electric motor, and/or related components non-removably mounted to a gooseneck trailer. The recompression system may, in certain embodiments, combine these non-removable components, a trailer chassis, a trailer frame, a trailer deck, an integrated pedestal, and/or a stabilizer system with the gooseneck trailer to provide fast response time, improved job site safety, and reduced pipeline downtime.

In certain embodiments, the compressor frame of the trailer-mounted recompression system is driven by an electric motor with zero emissions. In some embodiments, the electric motor may be greater than 100 horsepower (hp), greater than 200 hp, greater than 250 hp, or greater than 300 hp. In certain embodiments, the recompression system may include a 300 hp motor. In some embodiments, the trailer-mounted recompression system includes an electric motor of at least 1,800 rotations per minute (RPM), at least 1,500 RPM, at least 1,000 RPM, or at least 500 RPM.

In certain embodiments, a similar trailer-mounted recompression system can be equipped with a smaller hp motor or a larger hp motor. In some embodiments, the electric motor may drive a reciprocating compressor or a screw compressor. In certain embodiments, the electric motor may be driven by a reciprocating internal combustion engine and alternator (generator). In certain embodiments, the prime mover may be a power supply, such that the electric motor for the recompression system is driven by an electric power supply. In such embodiments, the electric power supply could be a generator or utility power. In certain embodiments, compressors are coupled to a control system and a direct drive internal combustion engine mounted on the trailer with no electric motor. In particular, the compressor frame may be mounted to the direct drive internal combustion engine and driven by the direct drive internal combustion engine (e.g., via a flywheel and flywheel housing). In an embodiment, the internal combustion engine could be mounted to the trailer via a mounting bracket and/or a small mounting skid.

In particular, the trailer-mounted recompression system includes a compressor. As an example and not by way of limitation, the compressor may include a two-throw natural gas compressor. As an example and not by way of limitation, the compressor may include a four-throw natural gas compressor. As an example and not by way of limitation, the compressor may include a two-stage or three-stage natural gas compressor.

The recompression systems of the present disclosure may, in some embodiments, have a small footprint that is easier to fit into customer sites. For example, in certain embodiments, the entire recompression system may be sufficiently compact to fit on a single trailer. In some embodiments, the trailer may have a total length of 60 feet or less, 50 feet or less, or 40 feet or less. The deck length of the trailer may be 50 feet or less, 40 feet or less, or 35 feet or less. In certain embodiments, the trailer may be an integrated gooseneck trailer having a deck length of 32 feet, a total length of 40 feet, and a total weight of 34,000 lbs. In some embodiments, the trailer may include heavy duty (e.g., 15,000 lbs) tandem dual axles with brakes. In some embodiments, the total combined weight of the recompression system and trailer is less than 50,000 lbs, less than 40,000 lbs, or less than 35,000 lbs. In certain embodiments, the hyper mobile recompression system and trailer is towable using a Class 3 truck, medium duty truck, and/or one ton truck. In some embodiments, the methods of the present disclosure do not include transporting the recompression system and trailer with a Class 8 truck, or transporting with a truck of Class 8 or lower, Class 7 or lower, Class 6 or lower, Class 5 or lower, Class 4 or lower, or Class 3 or lower.

Figure 1B:
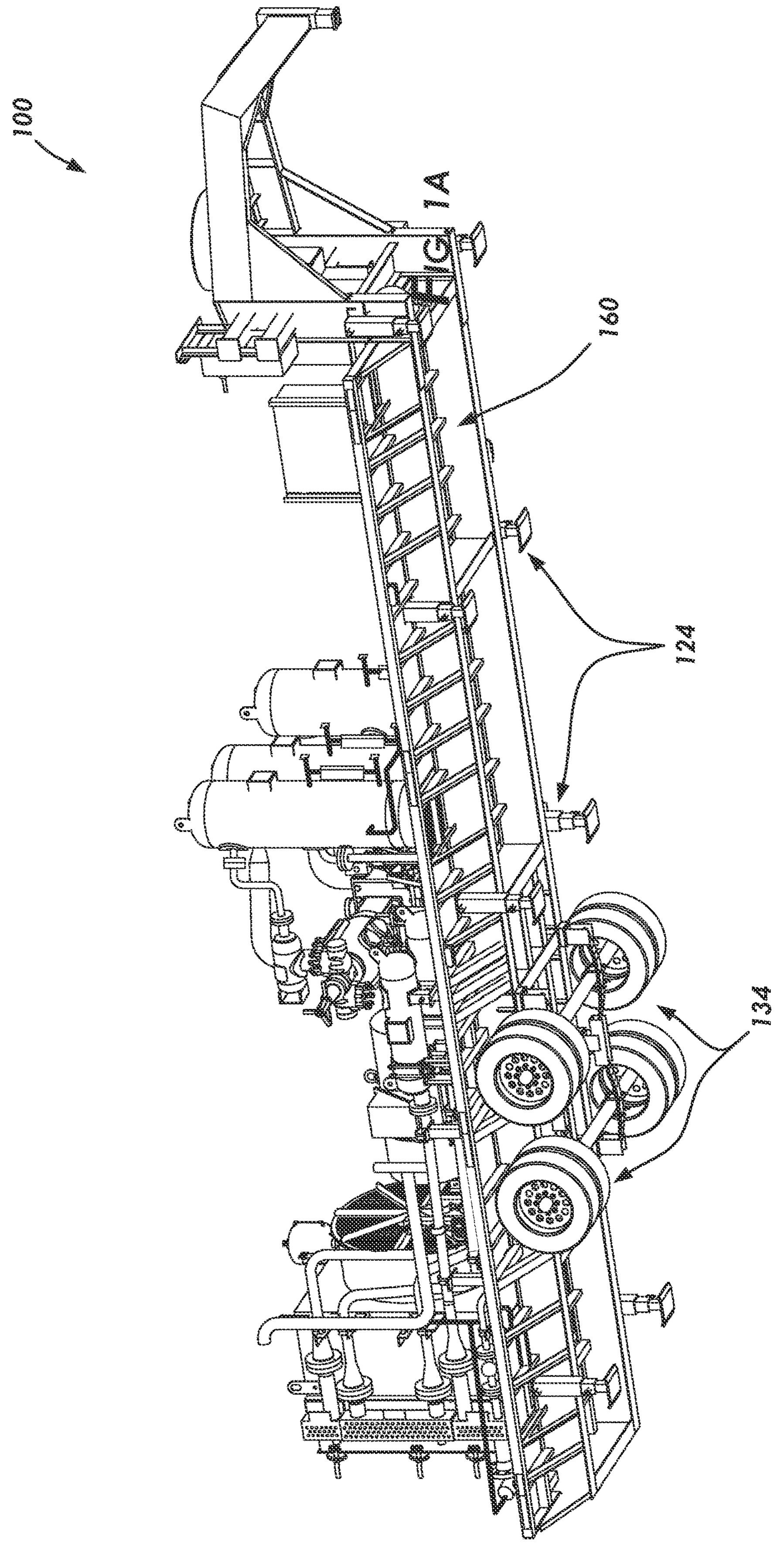
Figure 3:
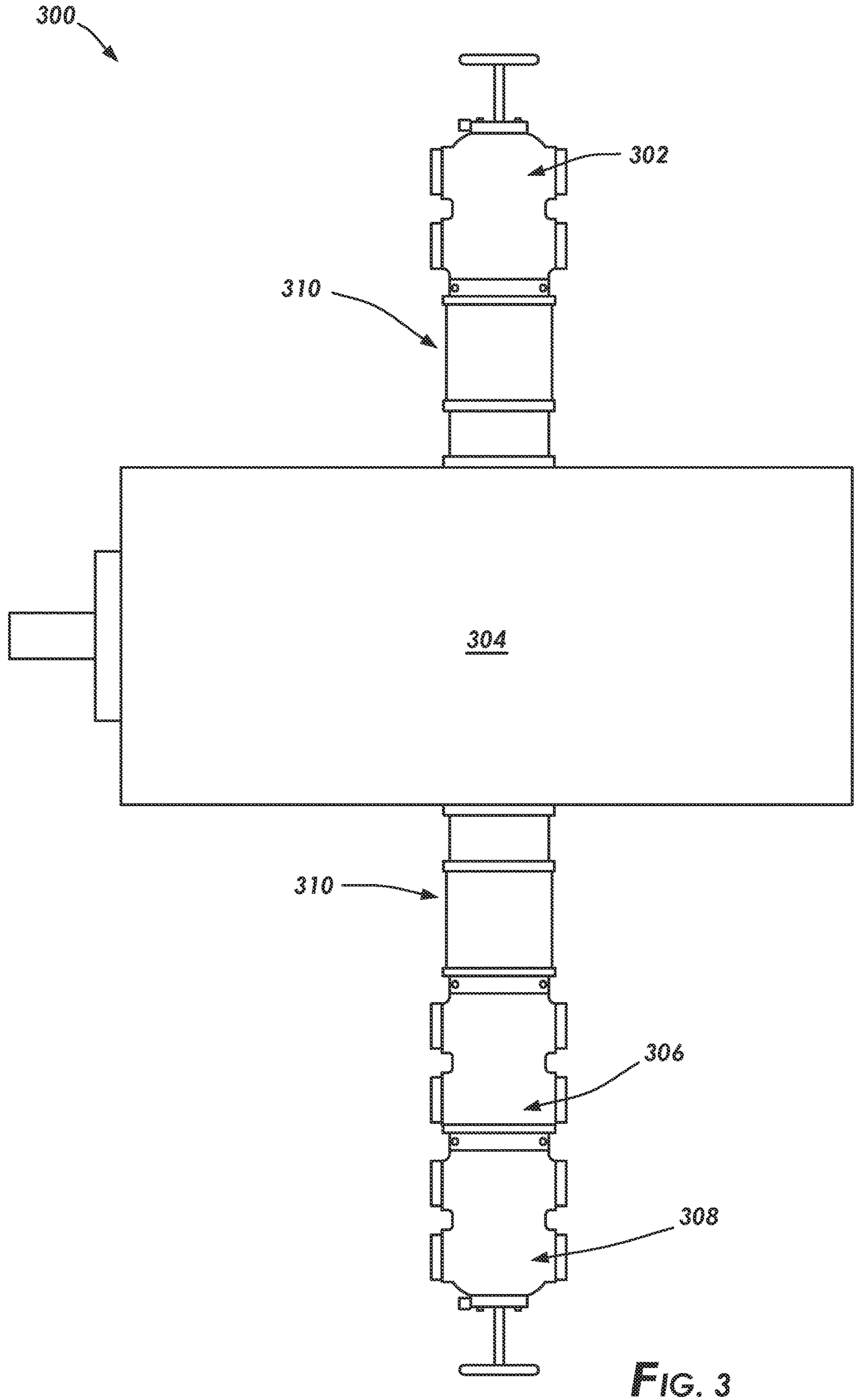
FIG. 3 depicts a multi-stage recompression system, in accordance with aspects of the present disclosure.

FIGS. 1A and 1B depict a trailer-mounted recompression system 100 in accordance with one or more aspects of the present disclosure. As shown in FIG. 1A, the recompression system 100 may comprise a compressor 102. For example, the compressor 102 may be a medium-sized separable reciprocating natural gas compressor. As an example and not by way of limitation, the compressor 102 may include a two-throw natural gas compressor. As an example and not by way of limitation, the compressor 102 may include a four-throw natural gas compressor. As an example and not by way of limitation, the compressor 102 may include a two-stage or three-stage natural gas compressor. With reference to FIG. 3, in particular, the 3-stage reciprocating natural gas compressor may comprise a first stage compression cylinder 302, a horizontally balanced/opposed reciprocating compressor frame 304, a second stage compression cylinder 306, and a third stage compression cylinder 308. Additionally, the recompression system 100 can include various components, such as a direct drive coupling with guard, a mechanical vibration switch, and a cooler, etc. As another example, the recompression system 100 can receive a fluid from a first conduit or container at a first pressure. The fluid can be a liquid, gas, or some combination thereof. The recompression system 100 can compress the fluid through one or more compression cycles when the fluid enters and traverses through the one or more compression cycles of the recompression system 100. For each of the one or more compression cycles, the recompression system 100 can be set at increasing pressure thresholds to protect the subsequent cycle, and cool the fluid during and after compression.

In an embodiment, the compressor 102 can include one or more variable volume clearance pockets (VVCP) 136 to change a clearance volume of the head end of a compressor cylinder, such as the first stage compression cylinder 302 and the third stage compression cylinder 308. The one and more VVCPs can be used to control capacity to efficiently adjust the compressor 102 throughput and power. In particular, the amount of clearance may be associated with the position of the clearance pocket piston. In particular, the one or more VVCPs 136 can include multiple mechanical components, such as adapter, piston, seal ring, stem, vent, and the like to open and close at a particular capacity percentage. Likewise, a compressor oil day tank 128 may be connected to the compressor 102 to provide oil or lubricating oil in a compressor body oil sump for providing lubrication between each friction pair in the recompression system 100. The compressor oil day tank 128 may be a reservoir to hold compressor lubricant to keep crankcase at a desired level for operation.

In an embodiment, the compressor 102 is coupled to a plurality of other various types of equipment and components for operations. The compressor 102 is coupled to an electric motor 104 and a plurality of scrubbers 108. In certain embodiments, the plurality of scrubbers 108 may comprise a stage 1 scrubber, a stage 2 scrubber, and a stage 3 scrubber which are used to scrub liquid from the fluid from each of the first, second, and third stage compression cylinders. In particular, the stage 1 scrubber may be connected to the first stage compression cylinder 302. The stage 2 scrubber may be connected to the second stage compression cylinder 306. The stage 3 scrubber may be connected to the third stage compression cylinder 308. The plurality of scrubbers 108 may include various accessories, including, but not limited to a level gauge, a high liquid level shutdown switch, a temperature indicator, a manual dump valve, mesh pad elements, and a manual drain valve. The plurality of scrubbers 108 may include one or more pulsation bottles 126 comprising one or more pressure valves which damp or absorb pressure from the compression cylinders. As shown in FIG. 1A, the compressor 102 is connected to a suction valve 148. In certain embodiments, the suction valve may have a design pressure of 1,270 pounds per square inch (PSI) and a working temperature range of from about −20° Fahrenheit (F) to about 200° F. Likewise, the plurality of scrubbers 108 can include one or more pulsation bottles 126 which comprise a discharge valve 150. In certain embodiments, the discharge valve 150 may have a design pressure of from about 1,270 to about 1,440 PSI and a working temperature range of from about −20° F. to about 350° F. The fluid enters the recompression system 100 through the suction valve 148 (e.g., from a first conduit or container such as a section of a pipeline) and leaves the recompression system 100 through the discharge valve 150 to flow to a destination (e.g., a second conduit or container). In certain embodiments, the discharge valve 150 may fluid to a processing facility, a storage tank, a pipeline, or a retail/utility company. The plurality of scrubbers 108 may be arranged in parallel of the previously divided fluid such that a first part of the fluid is supplied in parallel to the stage 1 scrubber, a second part of the fluid is supplied to the stage 2 scrubber, and a third part of the fluid is supplied to the stage 3 scrubber. In an embodiment, the scrubbers are upstream of each stage of compression. For example, in certain embodiments, the fluid enters the suction line then passes through the stage 1 scrubber then into stage 1 compression cylinder then into the cooler, then into stage 2 scrubber then into stage 2 compression cylinder then through cooler then into stage 3 scrubber, then into stage 3 compression cylinder then through cooler then exits compressor package into second vessel.

In an embodiment, the plurality of scrubbers 108 may be applied to remove liquid droplets, such as heavier liquids in the fluid, from the fluid at an appropriately controlled temperature and pressure before the fluid enters and traverses through the one or more compression cycles. In an embodiment, the plurality of scrubbers 108 only captures liquids through a process which uses gravity to hold a heavier liquid to the bottom of the vessel and allow the fluid to exit the top of the vessel. In an embodiment, a cooler, such as a heat exchanger 106, can remove heat from the fluid and remove heat from compressor lubricant. Any liquid captured in the plurality of scrubbers 108 is drained into a holding bucket and properly disposed of.

The heat exchanger 106 can include one or more heat exchange devices (e.g., large heat radiator) which cools the fluid after compression and the lubricant used by the compressor frame. During the recirculation process, a fluid which is saturated with water vapor may be compressed and condense on dust and other particles in the fluid to become liquid droplets. Thus, liquids can be removed from the fluid by using the plurality of scrubbers 108 and the compressor 102. The fluid can be drained from the recompression system using a remote scrubber drain 142. In some embodiments, the heat exchanger 106 may be a forced draft heat exchanger, and the electrical motor may turn a fan to force air across the cooler to increase heat removal, increasing the cooling effect.

In an embodiment, the recompression system 100 can discharge the fluid void of liquid pollutant droplets to a second conduit or container at a second pressure. In some embodiments, the compressor 102 may be driven by an electric motor 104 with zero emissions. In particular, the compressor 102 and the electric motor 104 are positioned above and on a pedestal 152. The electric motor 104 can include a 300 hp engine at about 1,800 revolutions per minute (RPM). As shown, the compressor 102 is coupled to a plurality of motor starters 116 and an electrical junction box 120. For example, the plurality of motor starters 116 can be used for a pre-lube pump and cooler fan motor, a combination RVSS starter, the compressor, and/or the electric motor. The plurality of motor starters 116 can vary in size, horsepower, transfer switches, and inverters to adjust voltage for various house multiple power battery chargers and related equipment in a compact cabinet. As another example, the electrical junction box 120 may be contained in a single housing for relaying an electrical connection. A controller 114 may be wired to the plurality of motor starters 116, the electric junction box 120, the plurality of scrubbers 108, the compressor 102, the electric motor 104, the heat exchanger 106, and other electric components of the recompression system 100. The controller can include multiple controlling circuits using an inverter to operate or synchronize one or more electric components of the recompression system 100. In certain embodiments, the compressor 102 and related components do not include and/or are not mounted a skid.

FIG. 1B depicts the recompression system 100 can be non-removably mounted to a single gooseneck trailer 160 supported by a plurality of landing gears 124. For example, in some embodiments, the non-removable recompression system 100 is bolted down, welded down, or otherwise non-removably coupled to the trailer 160. In some embodiments, the recompression system 100 is operated on the trailer 160 and does not require offloading from the trailer 160 prior to operation. In certain embodiments, the recompression system 100 is trailer mounted with quick and safe input and output disconnects for improved portability. Thus, the recompression system 100 can be efficiently transported to a work site by hauling the trailer using a Class 3 truck. Additionally, the gooseneck trailer 160 can be combined with a trailer chassis, a trailer frame, a trailer deck, a compressor pedestal, and a stabilizer system. The single gooseneck trailer 160 may have a total weight below the towing capacity of a 1 ton pick-up truck or Class 3 truck. This may allow a recompression system operator to transport the equipment to a work site at a lower cost by hauling the gooseneck trailer using a Class 3 truck via the gooseneck coupler 138, without the need for a separate driver trained to drive larger trucks (e.g., Class 7 or 8 trucks). Additionally, the single gooseneck trailer 160 may have a total footprint small enough to a fit on more work sites than traditional recompression systems mounted on skids and hauled by Class 7 or 8 trucks. For example, the integrated gooseneck trailer can have a deck length of 32 feet, a total length of 40 feet, and a total weight of 34,000 lbs. As another example, the integrated gooseneck trailer can include a plurality of dual wheel axles with brakes 134. In particular, the dual wheel axles with brakes 134 can be two pairs of heavy duty 15,000 lb tandem dual axles.

Figure 2:
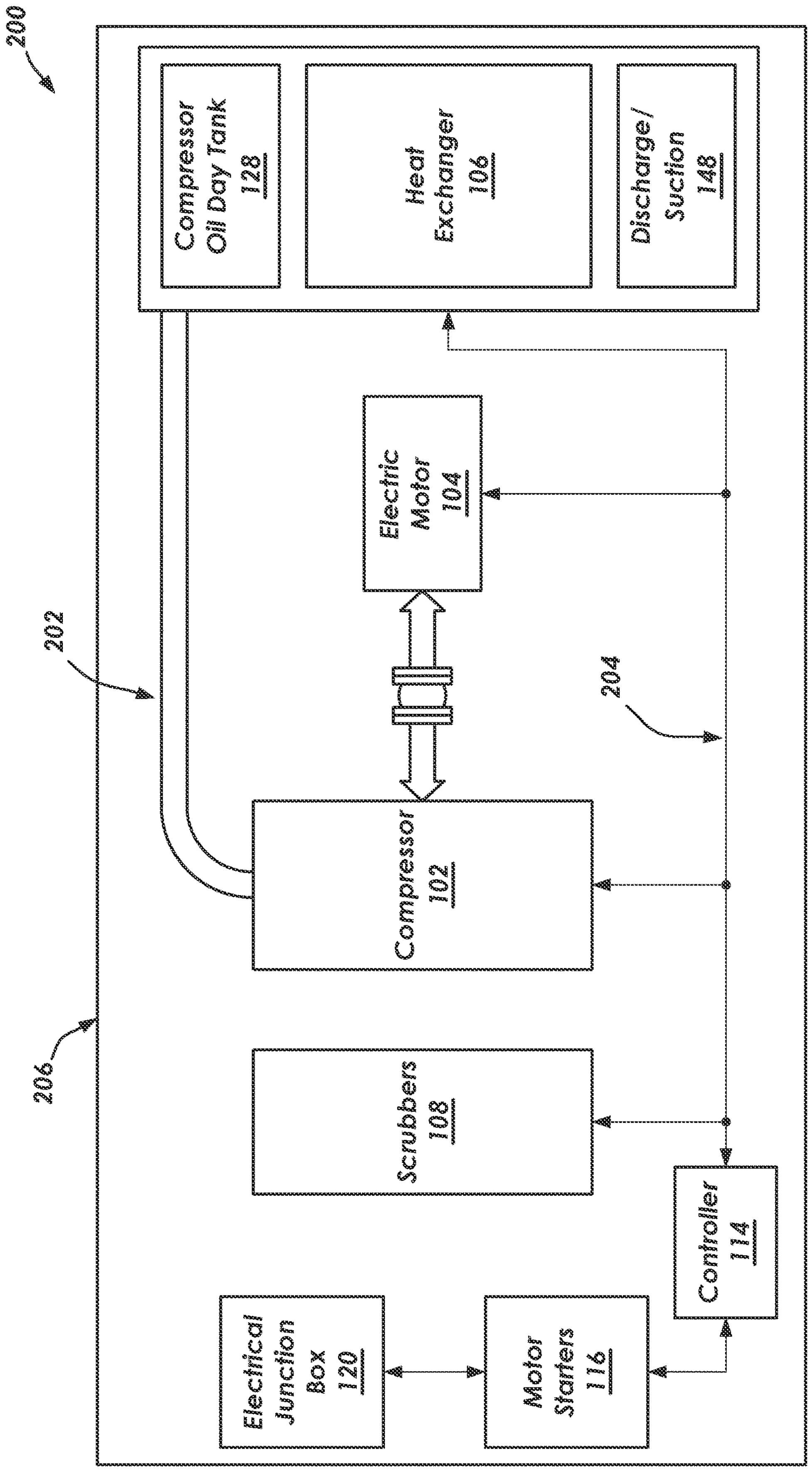
FIG. 2 depicts a schematic view of a trailer-mounted recompression system control architecture 200, in accordance with aspects of the present disclosure.

FIG. 2 depicts an expanded view of a trailer-mounted recompression system control architecture 200, in accordance with aspects of the present disclosure. As shown in FIG. 2, a recompression system control architecture 200 is configured to provide a control system for controlling the operation of the recompression system. For example, a controller 114 may be programmed to determine when to activate, synchronize, adjust, or otherwise control a plurality of devices and/or electronic components mounted on a trailer frame 206 of a gooseneck trailer. The controller 114 may communicate with the plurality of devices and/or electronic components through control signals, which may be sent remotely (e.g., via wireless signal) or directly through a hardwired control system. In particular, the plurality of devices and/or electronic components may include a compressor 102, one or more electric motors 104, a plurality of scrubbers 108, one or more heat exchangers 106, a plurality of motor starters, and one or more electrical junction boxes 120, and any other components of the recompression system. The plurality of devices and/or electronic components may be wired together via electric lines 204 to maintain normal operation of the compressor 102. The controller 114 may, among other things, adjust one or more parameters of the recompression system in response to a particular operating condition, such as in response to an abnormal fluid temperature, system temperature, or system pressure differential. In certain embodiments, the controller 114 may be applied to control a crankcase immersion heater to heat up the compressor lubricant at start up if ambient temperatures are too low. For example, when the system temperature is too high above a predetermined value, the controller 114 may be programmed to send a command signal the heat exchanger 106 to operate to reduce the system temperature. As another example, when the compressor oil day tank 128 is empty, the controller 114 may be programmed to send a command signal to refill the compressor oil day tank 128 to maintain normal operation of the recompression system. As yet another example, the recompression system control architecture 200 may be applied to maintain the pressure of the fluid at the exit point, such as discharge valve 150, when removing the fluid from a pipeline during pipeline maintenance, repair, and testing.

In an embodiment, a plurality of electrical components, such as the electrical junction box 120, the plurality of motor starters 116, and the controller 114 are mounted in a location close to a trailer jack at an end near the gooseneck coupler 138 of the gooseneck trailer 160. In other embodiments, the plurality of electrical components and/or control system may be mounted at other locations on the trailer, for example, adjacent to other parts of the recompression system. As an example and not by way of limitation, the plurality of motor starters 116, and the controller 114 can be Class 1 Division 1 or Division 2 electric systems or explosion proof electrical components. In such a configuration, when an operator stands on the ground adjacent to the location of these components on the gooseneck trailer 160, all controls and valves may be within reach of the operator.

FIG. 3 depicts a multi-stage recompression system 300, in accordance with aspects of the present disclosure. The multi-stage recompression system 300 can comprise a first stage compression cylinder 302, a reciprocating gas compressor frame 304, a second stage compression cylinder 306, and a third stage compression cylinder 308. Likewise, the multi-stage recompression system 300 can comprise a first stage compression cylinder 302, a reciprocating gas compressor frame 304, and a second stage compression cylinder 306 for two stage operation. These compression cylinders are connected in series so a first stage compression cycle, a second compression cycle, and a third compression cycle are carried out consecutively to provide high flow rate with less down time. The multi-stage recompression system can efficiently use less power and produce less heat than a conventional single-stage recompression system. The multi-stage recompression system 300 can be driven by an electric motor 104. Furthermore, the multi-stage recompression system 300 may include a plurality of sensors or meters to monitor the operation of the compressor 102. The plurality of sensors may include a flow meter, a pressure sensor, a temperature sensor, or other sensor configured to monitor output of the compressor 102 and provide feedback to adjust the electric motor 104.

In an embodiment, the multi-stage recompression system 300 is connected to a plurality of draining units and valves, such as a packing vent and drain and a distance piece drain through one or more connections 310. The distance piece drain is a non-pressurized unit to segregate a compression cylinder from the crosshead and ultimately from the crankcase. This is to avoid cylinder oil and compressed gas from migrating through the piston rod via a packing gland. The multi-stage recompression system may route all the gas leakage to the packing vent and to a disposal or collection system, such as a vent stack or drip pot, to control the compressor emissions. There may be a plurality of leak paths that allow the gas to bypass the rod packing vent and leak into the distance piece. In addition, the multi-stage recompression system 300 may include fans, transformers, circuit boards, inductors, terminals, capacitors, and other components.

Figure 4:
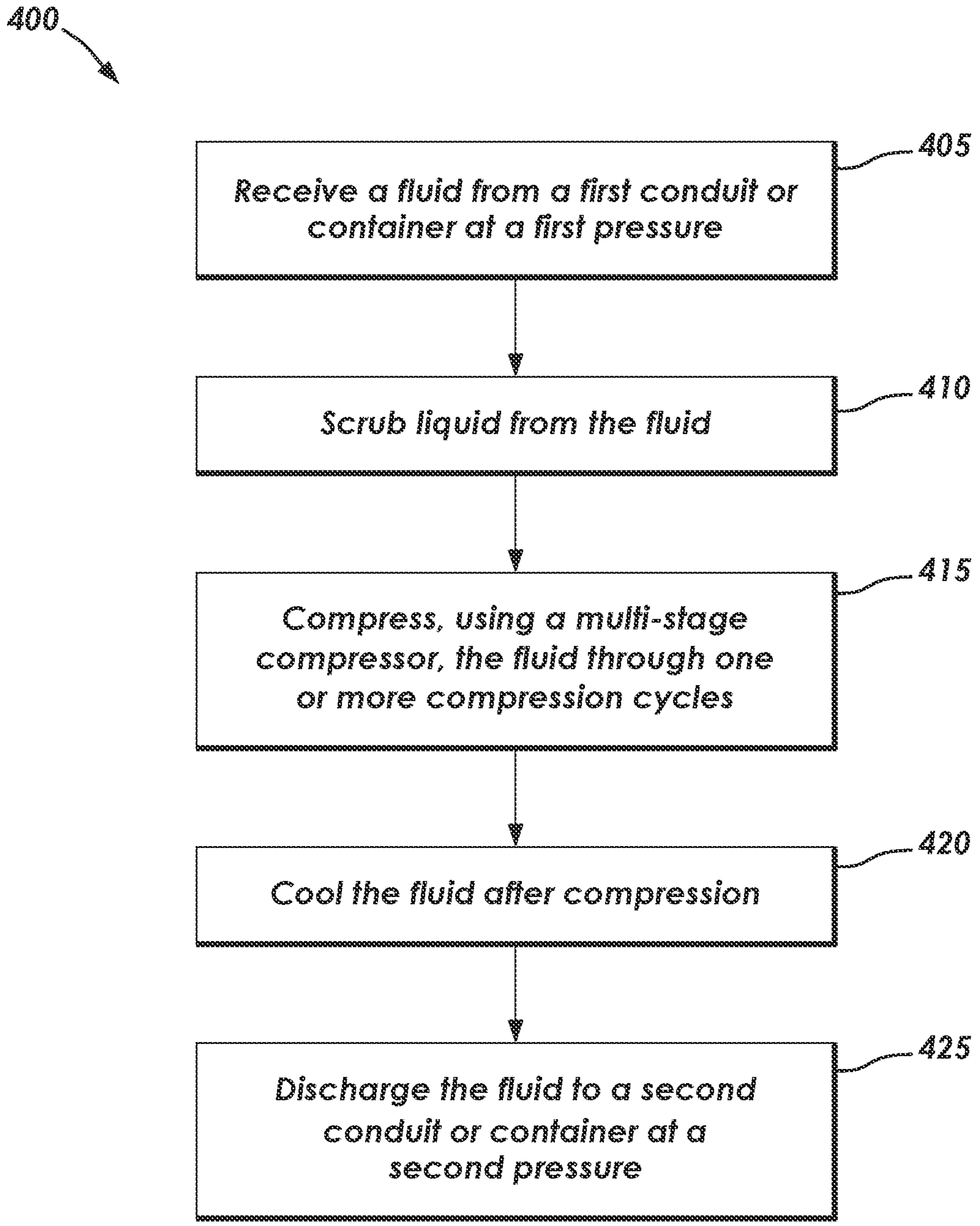
FIG. 4 is a flow diagram that depicts a recompression method, in accordance with aspects of the present disclosure.

A method and process for operating the recompression system of the present disclosure according to certain embodiments of the present disclosure is described in more detail with respect to FIG. 4. At step 405, a fluid (e.g., a process fluid) is received from a first conduit or container at a first pressure. The first conduit or container may, in certain embodiments, be a section of pipeline, a storage tank, a vessel, a or another portion of a drilling, refining, or fluid transport system. For example, the first conduit or container can be a pipeline which is out of service for planned maintenance, inspection, or repair. In some embodiments, the first conduit or container may be a pipeline through which natural gas travels into the scrubbers and the multi-stage compressor. At step 410, liquid is scrubbed from the fluid. As discussed with respect to FIG. 1A, a plurality of scrubbers 108 can be applied to remove liquid droplets of pollutants from the fluid at an appropriately controlled temperature and pressure before the fluid enters and traverses through the one or more compression cycles. For example, the plurality of scrubbers may be used to remove pollutants from the fluid before each compression stage. The collected fluid can be drained from the scrubber vessel using a remote scrubber drain 142.

At step 415, the fluid is compressed through one or more compression cycles using the multi-stage compressor. The multi-stage compressor and other non-removable components, such as a trailer chassis, a trailer frame, a trailer deck, an integrated pedestal, and a stabilizer system are mounted onto a gooseneck trailer to provide fast response time, improved job site safety, and reduced pipeline downtime. In an embodiment, a crank case immersion heater is used to heat the compressor lubricant at start up if ambient temperatures are too low. In particular, a first stage compression cycle, a second compression cycle, and a third compression cycle are carried out consecutively to provide high flow rate with less down time. At step 420, the fluid is cooled after each compression stage. In certain embodiments, the fluid may be cooled by passing it through a heat exchanger.

At step 425, the fluid is discharged to a second conduit or container at a second pressure. The second conduit or container may, in certain embodiments, be a section of pipeline, a storage tank, a vessel, a or another portion of a drilling, refining, or fluid transport system. For example, the second conduit or container can be a pipeline adjacent to an input pipeline, or a section of pipeline across a block valve or stopple from the input pipeline section to pass the fluid safely down the line. In some embodiments, the fluid can travel from or through the second conduit or container to a destination, such as a processing facility, a storage tank, or a retail/utility company. In particular, the method can maintain a discharge pressure, such as the second pressure, of the fluid at the exit point which is required to move the fluid into the second conduit.

Figure 5:
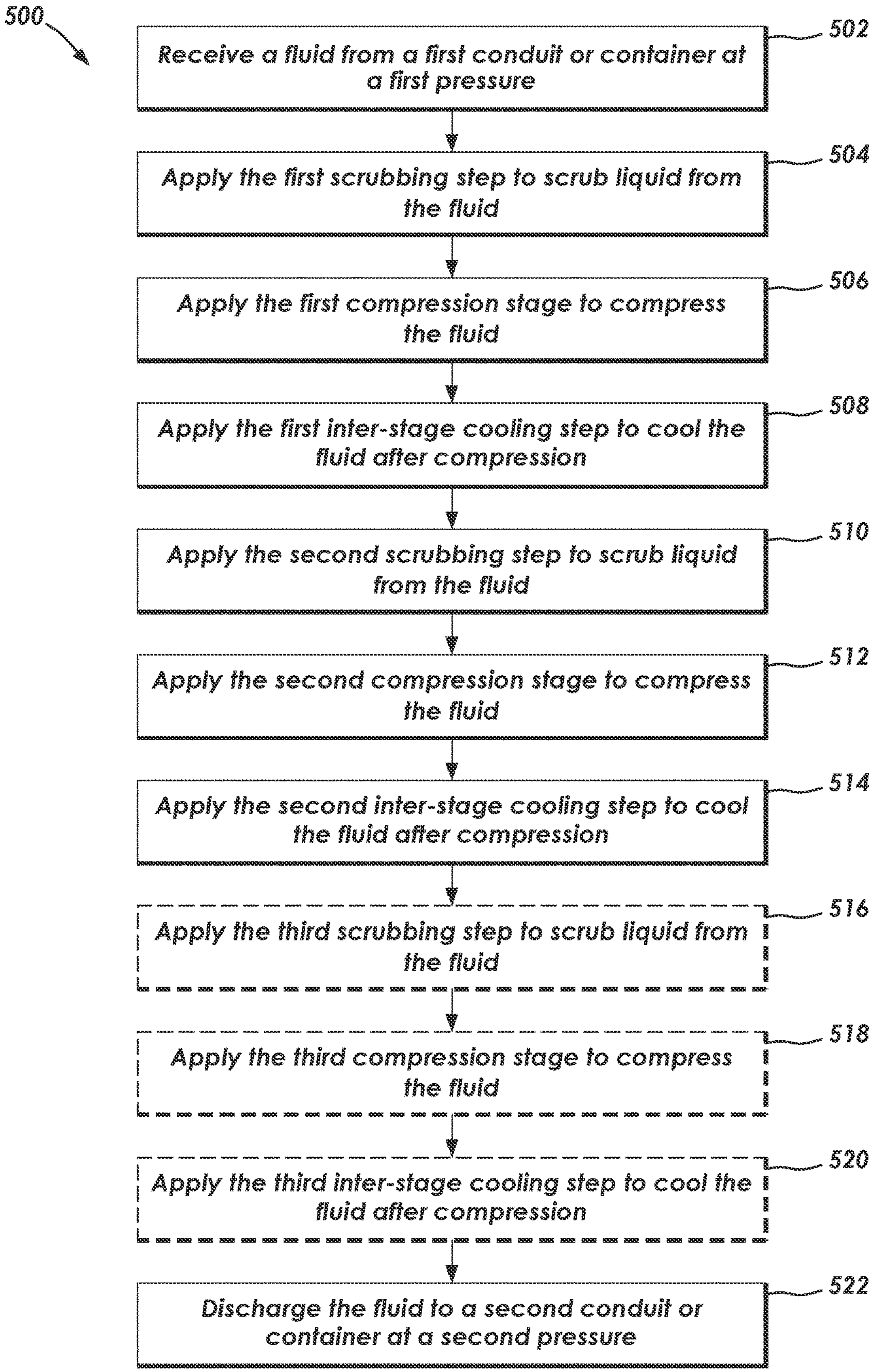
FIG. 5 is a flow diagram that depicts a multi-stage recompression method, in accordance with aspects of the present disclosure.

A method and process for operating the multi-stage recompression system of the present disclosure according to certain embodiments of the present disclosure is described in more detail with respect to FIG. 5. At step 502, a fluid (e.g., a process fluid) is received from a first conduit or container at a first pressure. The first conduit or container may, in certain embodiments, be a section of pipeline, a storage tank, a vessel, a or another portion of a drilling, refining, or fluid transport system. For example, the first conduit or container can be a pipeline which is out of service for planned maintenance, inspection, or repair. In some embodiments, the first conduit or container may be a pipeline through which natural gas travels into the scrubbers and the multi-stage compressor. At step 504, the first scrubbing step is applied to scrub liquid from the fluid. At step 506, the first compression stage is applied to compress the fluid. At step 508, the first inter-stage cooling step is applied to cool the fluid after compression. In particular, the fluid is cooled after compression by passing it through the heat exchanger. At step 510, the second scrubbing step is applied to scrub liquid from the fluid. At step 512, the second compression stage is applied to compress the fluid. At step 514, the second inter-stage cooling step is applied to cool the fluid after compression. In particular, the fluid is cooled after compression by passing it through the heat exchanger. At step 516, the third scrubbing step is applied to scrub liquid from the fluid. At step 518, the third compression stage is applied to compress the fluid. At step 520, the third inter-stage cooling step is applied to cool the fluid after compression. In particular, the fluid is cooled after compression by passing it through the heat exchanger. Step 516, Step 518, and Step 520 can be optional and associated with the multi-stage compressor. At step 522, the fluid is discharged to a second conduit or container at a second pressure. The second conduit or container may, in certain embodiments, be a section of pipeline, a storage tank, a vessel, a or another portion of a drilling, refining, or fluid transport system. For example, the second conduit or container can be a pipeline adjacent to an input pipeline, or a section of pipeline across a block valve from the input pipeline section to pass the fluid safely down the line. In some embodiments, the fluid can travel from or through the second conduit or container to a destination, such as a processing facility, a storage tank, or a retail/utility company. In particular, the method can maintain a discharge pressure, such as the second pressure, of the fluid at the exit point which is required to move the fluid into the second conduit when used to remove the fluid from a pipeline during pipeline maintenance, repair, and testing.

Thus, the present disclosure provides an improved recompression system and methods for use.

What is claimed is:

1. A method comprising:

receiving a fluid from a first conduit or container at a first pressure;

compressing, using a multi-stage compressor non-removably mounted to a trailer, the fluid through one or more compression stages;

cooling the fluid during and after compression, using at least one cooler non-removably mounted to the trailer;

scrubbing liquid from the fluid, using at least one scrubber non-removably mounted to the trailer, before each stage of compression; and discharging the fluid to a second conduit or container at a second pressure;

wherein the multi-stage compressor, the at least one cooler, and the at least one scrubber are electrically connected to a controller non-removably mounted to the trailer, wherein the controller is configured to allow a user to change one or more parameters of one or more of the multi-stage compressor, the at least one cooler, or the at least one scrubber in response to an operating condition during operation.

2. The method of claim 1, wherein:

the multi-stage compressor is coupled to a control system and an electric motor that are also non-removably mounted to the trailer.

3. The method of claim 2, wherein:

the trailer is a gooseneck trailer, and a plurality of electrical components and the control system are mounted at an end of the trailer closest to a trailer jack.

4. The method of claim 2, wherein:

a plurality of electrical components and the control system are Class 1 Division 1 or Division 2 electric systems or explosion proof electrical components.

5. The method of claim 1, wherein:

the multi-stage compressor is coupled to a control system and an internal combustion engine that are also non-removably mounted to the trailer, and the internal combustion engine is mounted to the trailer via a mounting bracket.

6. The method of claim 1, further comprising:

transporting the multi-stage compressor to a work site by hauling a gooseneck trailer using a Class 3 truck.

7. The method of claim 1, furthering comprising:

scrubbing the liquid from the fluid using a plurality of scrubbers; and cool the fluid with a cooler.

8. The method of claim 1, wherein:

the multi-stage compressor and trailer do not include a skid.

9. The method of claim 1, wherein:

the first and second pressures are each in the range of from about 0 psig to about 1,100 psig.

10. The method of claim 1, further comprising:

maintaining the second pressure of the fluid around an outlet pressure required to move the fluid into the second conduit.

11. A system comprising:

a fluid recompression system comprising a multi-stage compressor, multi-stage scrubbers, and an electric motor, wherein the fluid recompression system is non-removably mounted to a trailer and is configured to:

receive a fluid from a first conduit or container at a first pressure;

compress the fluid through one or more compression stages;

cool the fluid between at least one of the one or more compression stages;

scrub liquid from the fluid before each compression stage; and discharge the fluid to a second conduit or container at a second pressure;

wherein the fluid recompression system is electrically connected to a controller non-removably mounted to the trailer, wherein the controller is configured to allow a user to change one or more parameters of the multi-stage compressor or the multi-stage scrubbers in response to an operating condition during operation.

12. The system of claim 11, wherein:

the multi-stage compressor is coupled to a control system and an electric motor non-removably mounted to the trailer.

13. The system of claim 12, wherein:

the trailer is a gooseneck trailer, and a plurality of electrical components and the control system are mounted at an end of the trailer closest to a trailer jack.

14. The system of claim 12, wherein:

a plurality of electrical components and the control system are Class 1 Division 1 or Division 2 electric systems or explosion proof electrical components.

15. The system of claim 11, wherein:

the multi-stage compressor is coupled to a control system and an internal combustion engine that are also non-removably mounted to the trailer, and the internal combustion engine is mounted to the trailer via a mounting bracket.

16. The system of claim 11, wherein the recompression system is further configured to:

scrub liquid from the fluid using a plurality of scrubbers; and cool the fluid with a cooler.

17. The system of claim 16, wherein:

the plurality of scrubbers comprise one or more pulsation bottles comprising a discharge valve having a design pressure of from about 1,270 pounds per square inch (PSI) to about 1,440 PSI and a working temperature range of from about −20 Fahrenheit (F) to about 350° F.

18. The system of claim 11, wherein:

the recompression system does not include and is not coupled to a skid.

19. The system of claim 11, wherein:

the first and second pressures are each in the range of from about 0 psig to about 1,100 psig.

20. A recompression system comprising:

an inlet couplable to a first conduit or container configured to receive a fluid at a first pressure;

an outlet couplable to a second conduit or container configured to discharge the fluid at a second pressure;

one or more scrubbers;

one or more coolers;

a controller; and a multi-stage compressor, wherein the multi-stage compressor, the at least one cooler, and the at least one scrubber are electrically connected to the controller wherein the recompression system is non-removably mounted to a trailer and is configured to:

receive the fluid from the first conduit or container at the first pressure;

compress the fluid through one or more compression stages;

cool the fluid after each stage of compression;

scrub liquid from the fluid using the one or more scrubbers before each stage of compression; and discharge the fluid to the second conduit or container at the second pressure;

and wherein the controller allows a user to change one or more parameters of the multi-stage compressor, the at least one cooler, or the at least one scrubber in response to an operating condition during operation.

* * * * *